United States Patent
Imamori et al.

(10) Patent No.: US 11,777,387 B2
(45) Date of Patent: Oct. 3, 2023

(54) ARMATURE, LINEAR MOTOR, METHOD OF MANUFACTURING ARMATURE

(71) Applicant: FUJI ELECTRIC CO., LTD., Kanagawa (JP)

(72) Inventors: Satoshi Imamori, Tokyo (JP); Terukazu Akiyama, Tokyo (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 17/648,703

(22) Filed: Jan. 24, 2022

(65) Prior Publication Data

US 2022/0286033 A1 Sep. 8, 2022

(30) Foreign Application Priority Data

Mar. 8, 2021 (JP) ................. 2021-036367

(51) Int. Cl.
*H02K 41/03* (2006.01)
*H02K 1/12* (2006.01)
*H02K 15/02* (2006.01)
*H02K 15/04* (2006.01)

(52) U.S. Cl.
CPC ............ *H02K 41/03* (2013.01); *H02K 1/12* (2013.01); *H02K 15/02* (2013.01); *H02K 15/0435* (2013.01)

(58) Field of Classification Search
CPC .. H02K 41/03; H02K 41/031; H02K 15/0435; H02K 1/12; H02K 15/02; H02K 1/08; H02K 1/24; H02K 3/18; H02K 3/52
See application file for complete search history.

(56) References Cited

U.S. PATENT DOCUMENTS

| 2007/0205673 | A1* | 9/2007 | Sugita | H02K 41/03 310/12.25 |
| 2010/0320847 | A1* | 12/2010 | Kakihara | H02K 41/03 310/12.02 |
| 2018/0076675 | A1* | 3/2018 | Wakayama | H02K 41/031 |

FOREIGN PATENT DOCUMENTS

| JP | H10-323011 | 12/1998 |
| JP | 2007-049817 | 2/2007 |
| JP | 2007236152 A | * 9/2007 |
| WO | 2012/147212 | 11/2012 |

OTHER PUBLICATIONS

JP-2007236152-A machine translation Dec. 16, 2022.*

* cited by examiner

*Primary Examiner* — Leda T Pham
(74) *Attorney, Agent, or Firm* — IPUSA, PLLC (57) ABSTRACT

An armature includes a plurality of cores arranged in a straight line and discontinuous with each other, a plurality of coils wound around each of the cores, and a holding section configured to hold the cores. At least one of the cores include division cores separate from each other and arranged in an axial direction thereof. Each of the division cores has a flange at a contact surface thereof that is in contact with the holding section, and at least a portion of the contact surface protrudes toward the holding section to form the flange.

7 Claims, 6 Drawing Sheets

ARMATURE, LINEAR MOTOR, METHOD OF MANUFACTURING ARMATURE

CROSS-REFERENCE TO RELATED APPLICATION

This application is based upon and claims priority to Japanese Patent Application No. 2021-036367, filed on Mar. 8, 2021, the entire contents of which are incorporated herein by reference.

BACKGROUND OF THE INVENTION

1. Field of the Invention

The present disclosure relates to an armature or the like.

2. Description of the Related Art

For example, linear motors including an armature in which multiple rod-shaped cores (teeth) that are not connected to each other are arranged in the traveling direction, and coils are wound around each of multiple cores are known (see Patent Document 1).

In Patent Document 1, two stators are arranged so as to face each other, and an armature is arranged between the two stators. The outer peripheral surfaces of both ends of the rod-shaped core (I-type armature teeth) are formed so as to protrude more outwardly than the outer peripheral surface of the intermediate section where the coil is wound, specifically, a fan shape in cross-sectional view.

According to this configuration, a magnetic attraction force acting on the armature core from one stator (permanent field magnet) and a magnetic attraction force acting on the armature core from the other stator (permanent field magnet) can be nominally offset. Even if magnetic asymmetry occurs due to, for example, a misalignment of the armature between the two stators and the magnetic attraction force acts toward either of the two stators, the core can be prevented from detaching from the armature by hooking the opposite end of the core to other parts of the armature.

However, when the outer peripheral surfaces of both ends of the core facing the two stators (permanent field magnet) are configured to protrude toward from the outer peripheral surface of the middle portion of the core, the core cannot be inserted through the center of the manufactured coil. As a result, a coil is required to be manufactured by winding the lead wire directly around the core, which may reduce the productivity of the armature.

In consideration of the above, with respect to a linear motor configured such that the armature is interposed between two permanent field magnets, it is desirable to provide a technique for preventing a decrease in the productivity of the armature while preventing multiple cores that are not connected to each other from detaching from the armature.

RELATED-ART DOCUMENTS

[Patent Document]
[Patent Document 1] Japanese Laid-open Patent Publication No. H10-323011

SUMMARY OF THE INVENTION

According to one aspect of an embodiment, an armature that includes a plurality of cores arranged in a straight line and discontinuous with each other, a plurality of coils wound around each of the cores, and a holding section configured to hold the cores is provided. At least one of the cores include division cores separate from each other and arranged in an axial direction thereof. Each of the division cores has a flange at a contact surface thereof that is in contact with the holding section, and at least a portion of the contact surface protrudes toward the holding section to form the flange.

According to another aspect of an embodiment, a linear motor that includes the above-described armature is provided.

According to yet another aspect of an embodiment, a method of manufacturing the above-described armature is provided. The method includes preparing a coil that has been wound in advance such that a cavity is formed in a center, and forming a core in which the coil is wound around thereof by inserting each of the division cores into the cavity from both end sides of the coil.

According to at least one embodiment, with respect to a linear motor configured such that the armature is interposed between two permanent field magnets, a decrease in the productivity of the armature can be prevented while preventing multiple cores that are not connected to each other from detaching from the armature.

DETAILED DESCRIPTION OF THE EMBODIMENTS

In the following, the embodiments will be described with reference to the drawings.

[Overview of a Linear Motor]

First, a linear motor 1 according to the present embodiment will be described with reference to FIG. 1.

Figure 1:
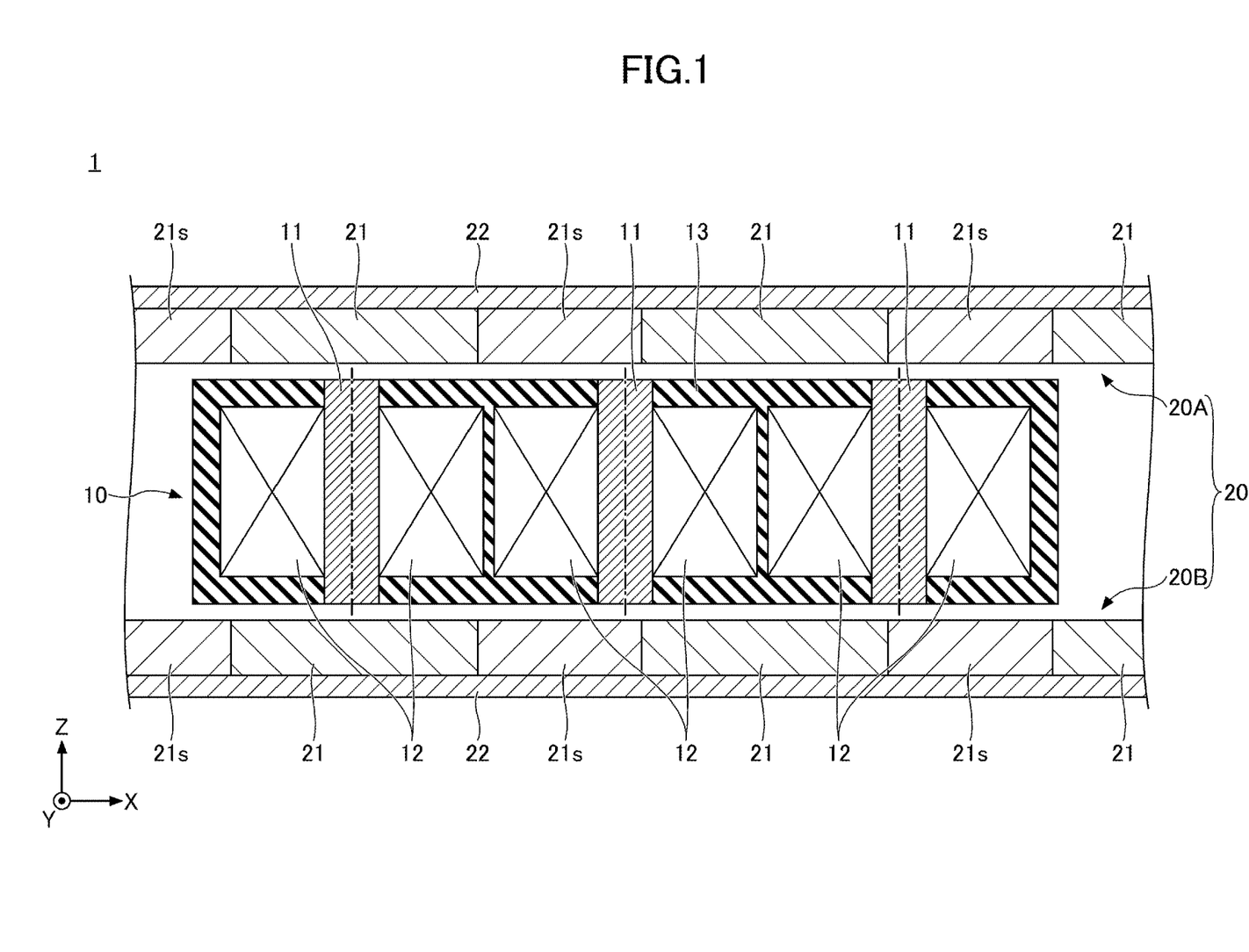
FIG. 1 is a diagram illustrating an example of a linear motor.

FIG. 1 is a diagram illustrating an example of the linear motor 1 according to the present embodiment. Specifically, FIG. 1 is a cross-sectional view of the linear motor 1 in the XZ plane viewed from the positive Y-axis side.

The linear motor 1 may be incorporated into the opening/closing mechanisms of various sliding doors, such as rail vehicle doors and station platform doors. Further, the linear motor 1 may be mounted, for example, in a semiconductor manufacturing device.

As illustrated in FIG. 1, the linear motor 1 includes an armature 10 and a field magnet 20.

The armature 10 is a mover. The armature 10 is interposed in the Z-axis direction between field magnet sections 20A and 20B of the field magnet 20. The field magnet sections 20A and 20B are arranged to extend along the X-axis direction. The armature 10 is supported such that the armature 10 is movable in the X-axis direction by, for example, a support mechanism such as a slide rail or a linear guide. The armature 10 may be allowed to have a predetermined amount of a movable range (what is called allowance) in the Z-axis direction by the support mechanism.

The armature 10 includes multiple (three) cores 11, multiple (three in the present example) coils 12, and a holding section 13.

The core 11 functions as a magnetic path of a magnetic field generated by the armature current of the coil 12 and a magnetic field from a permanent magnet 21 of the field magnet 20. The core 11 is made of, for example, a soft magnetic material such as an electrical steel plate or a powder magnetic core.

The multiple (three) cores 11 are configured such that the multiple (three) cores are not connected to each other (discontinuous with each other). As a result, the occupied space of the coils 12 can be expanded as compared with the case where the multiple cores 11 are connected by a connecting member. Therefore, the thrust of the linear motor 1 can be relatively improved. The multiple cores 11 are configured to extend in the Z-axis direction, that is, in the direction wherein the field magnet sections 20A and 20B face each other. The multiple cores 11 are arranged side by side at substantially equal intervals in the traveling direction of the linear motor 1, that is, in the X-axis direction. The term "substantially" is intended to permit manufacturing errors and the like, and is used in a similar meaning in the following.

When the armature current flows through the coil 12, the interaction with a magnetic field generated from the field magnet sections 20A, 20B causes generation of a thrust that moves the mover (i.e., the armature 10). Each of the multiple (three) coils 12 is formed of a conductive wire wound around the multiple cores 11. For example, three-phase electric power of U-phase, V-phase, and W-phase is provided to the three coils 12A.

A holding section 13 integrally holds the multiple cores 11 and the multiple coils 12. Specifically, the holding section 13 is made of a mold resin, and both ends of the multiple cores 11 in the axial direction (Z-axis direction) are held so as to be exposed from the holding section 13.

The field magnet 20 is a stator. The field magnet 20 extends in the X-axis direction, and the length of the field magnet 20 in the X-axis direction is defined in accordance with the movement amount of the armature 10 in the X-axis direction as a mover.

The field magnet 20 includes the field magnet sections 20A and 20B.

The field magnet sections 20A and 20B extend in the X-axis direction substantially parallel to each other. Between the field magnet sections 20A and 20B, a predetermined distance is provided in the Z-axis direction, and the predetermined distance is set to be larger than the length of the armature 10 in the Z-axis direction to some extent. For example, the distance between the field magnet sections 20A and 20B corresponds to an amount calculated by adding the movable amount of the supporting mechanism (e.g., a slide rail or a linear guide) of the armature 10 in the Z-axis direction and a predetermined margin to the length of the armature 10 in the Z-axis direction. This allows the armature 10, when acting as a mover, to move in the X-axis direction without contacting the field magnet sections 20A and 20B.

The field magnet sections 20A and 20B are arranged so as to face each other in the positive Z-axis direction and the negative Z-axis direction when viewed from the armature 10. Each of the field magnet sections 20A and 20B generates a magnetic flux that interlinks the multiple coils 12 of the armature 10.

Each of the field magnet sections 20A and 20B includes a permanent magnet 21 and a back yoke 22.

The multiple permanent magnets 21 are arranged side by side in the X-axis direction so as to face the armature 10 in the Z-axis direction. In the present example, the multiple permanent magnets 21 are arranged side by side in the X-axis direction at equal intervals, and spacers 21s are provided between the adjacent permanent magnets 21. For example, each of the multiple permanent magnet 21 is magnetized in the Z-axis direction opposite to the armature 10 and is disposed such that a magnetic pole of a surface facing the armature 10 differs from other permanent magnets 21 adjacent in the X-axis direction. For example, the multiple permanent magnets 21 may be arranged side by side in an X-axis direction in a Halbach array so that the magnetic flux of the magnetic pole facing the armature 10 is relatively strong. The multiple permanent magnets 21 are, for example, a neodymium sintered magnet, a ferrite magnet, and the like.

The field magnet section 20A and the field magnet section 20B are configured such that the magnetic specifications (e.g., the shape, the dimensions, the residual magnetic flux density, and the like) and the arrangement specifications (e.g., the arrangement positions of the permanent magnets 21 in the X-axis direction, a way of the arrangement including the presence or absence of the Halbach array, and the like) of the permanent magnets 21 are substantially the same. This enables the field magnet section 20A and the field magnet section 20B to generate substantially symmetrical magnetic fields in the space between the field magnet section 20A and the field magnet section 20B, which face each other in the Z-axis direction.

The back yoke 22 is arranged adjacent to a surface of the permanent magnet 21 that is opposite to the surface facing the armature 10 in the Z-axis direction. The back yoke 22 functions as a magnetic path between adjacent permanent magnets 21. The back yoke 22 is made of a soft magnetic material such as an electrical steel plate or a powder magnetic core.

First Example of Armature

Next, the first example of the armature 10 according to the present embodiment will be specifically described with reference to FIG. 2 to FIG. 4.

<Structure of Armature>

Figure 2:
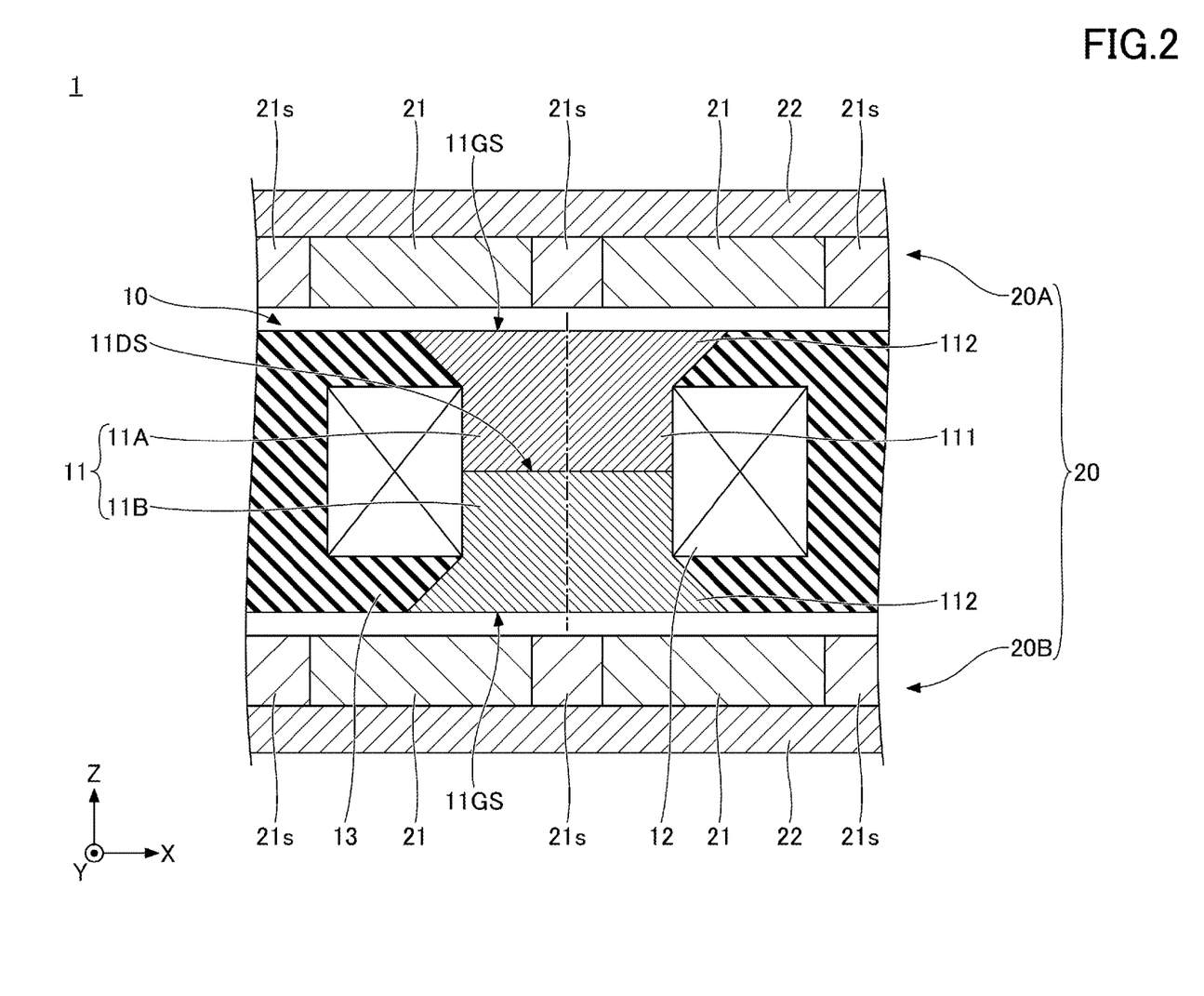
FIG. 2 is a diagram illustrating a first example of a structure of an armature.

FIG. 2 is a diagram illustrating a first example of the structure of the armature 10. Specifically, FIG. 2 is a cross-sectional view of the linear motor 1 including the armature 10 according to the present example in the XZ plane viewed from the positive Y-axis side.

As illustrated in FIG. 2, the core 11 includes an intermediate section 111 and a flange section 112.

The intermediate section 111 is a portion surrounded (wound) by the coil 12 in the Z-axis direction. The outer peripheral surface of the intermediate section 111 is configured to be slightly smaller inward than the inner peripheral surface of the center of the coil 12.

The flange sections 112 are provided at two locations, in the Z-axis direction, between the intermediate section 111 and each of both ends of the core 11. The flange section 112 is configured such that the outer peripheral surface of the flange section 112 protrudes toward (on the holding section 13 side) from the intermediate section 111. In the flange section 112, the entire outer peripheral surface in the circumferential direction around the axis of the core 11 (the long dash-dot line in FIG. 2) may protrude toward from the intermediate section 111, or a part of the outer peripheral surface in the circumferential direction may protrude toward from the intermediate section 111. In the present example, the flange section 112 is provided in a range extending between the intermediate section 111 and the end portion of the core 11 in the Z-axis direction, and is configured such that the outer peripheral surface extends outward from the intermediate section 111 side toward the end portion of the core 11. Therefore, with respect to both ends of the flange sections 112 in the axial direction (Z-axis direction), the portion having the maximum protrusion amount is exposed from the holding section 13.

Further, the core 11 includes a division surface 11DS between two flange sections 112 in the Z-axis direction, and includes two members 11A and 11B.

The members 11A and 11B (an example of a split core) are connected to each other by, for example, an adhesive applied to the division surface 11DS.

<Method of Manufacturing the Armature>

The armature 10 is manufactured by the following steps (1) to (6).

(1) Preparation (Manufacturing) of the Members 11A and 11B

The core 11 divided into multiple members 11A and 11B in the axial direction is manufactured (created). For example, when the core 11 is made of an electrical steel plate, the electrical steel plate pre-cut into a shape corresponding to the members 11A and 11B are laminated, and the layers are fixed to manufacture the members 11A and 11B. Welding, caulking, or the like may be used to fix the layers of the electrical steel plate, or an adhesive film previously applied to the electrical steel plate may be used.

(2) Preparation (Manufacturing) of the Coil 12

A lead wire is wound around the shaft member, then after the wounding is completed, the coil 12 having a cavity in the center is manufactured (created) by being pulled out from the shaft member. The shaft member may be, for example, a dedicated jig. Further, the coil 12 may be formed so as to have a cavity in the central portion by being wound around a hollow member such as a bobbin.

(3) Assembly of the Core 11 and the Coil 12

An adhesive is applied to the surface of the tip portion of the members 11A and 11B corresponding to the division surface 11DS. Then, by inserting the tip portions of the members 11A and 11B on the division surface 11DS side, from both sides of the central portion corresponding to the winding axis of the coil 12, the core 11 and the coil 12 are assembled, and thus, assembly of the core 11 and the coil 12 are completed. At this time, the tip portions of members 11A and 11B come into contact with each other, so that the members 11A and 11B are integrally connected by the adhesive.

(4) Connection of the Coil 12

The power line related to the coil 12 is connected. For example, a wire is connected between the leader wire of the coil 12 and the power supply terminal, or between the leader wires of the multiple coils 12.

(5) Resin Mold of the Core 11 and the Coil 12

The assembly of the multiple (three in the present example) cores 11 and coils 12 included in the armature 10 is molded with resin in a state of being arranged in a predetermined arrangement. As a result, the manufacture of the armature 10 in which the multiple cores 11 and the multiple coils 12 are integrally held by the mold resin (holding section 13) is completed.

<Action of the Armature>

Figure 3:
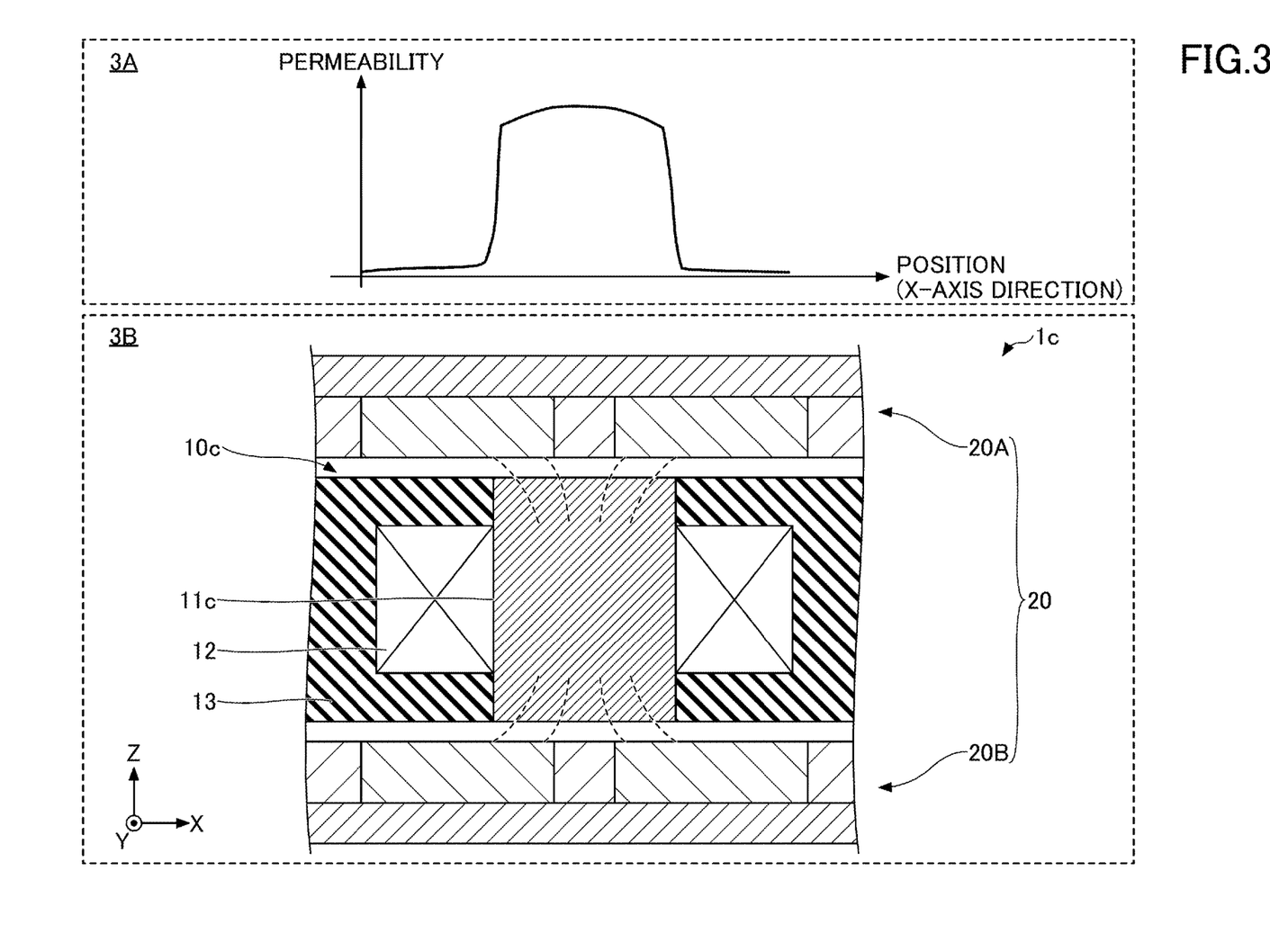
FIG. 3 is a diagram illustrating a distribution of magnetic permeability of a core in proximity to a gap surface in an armature according to a comparative example.
Figure 4:
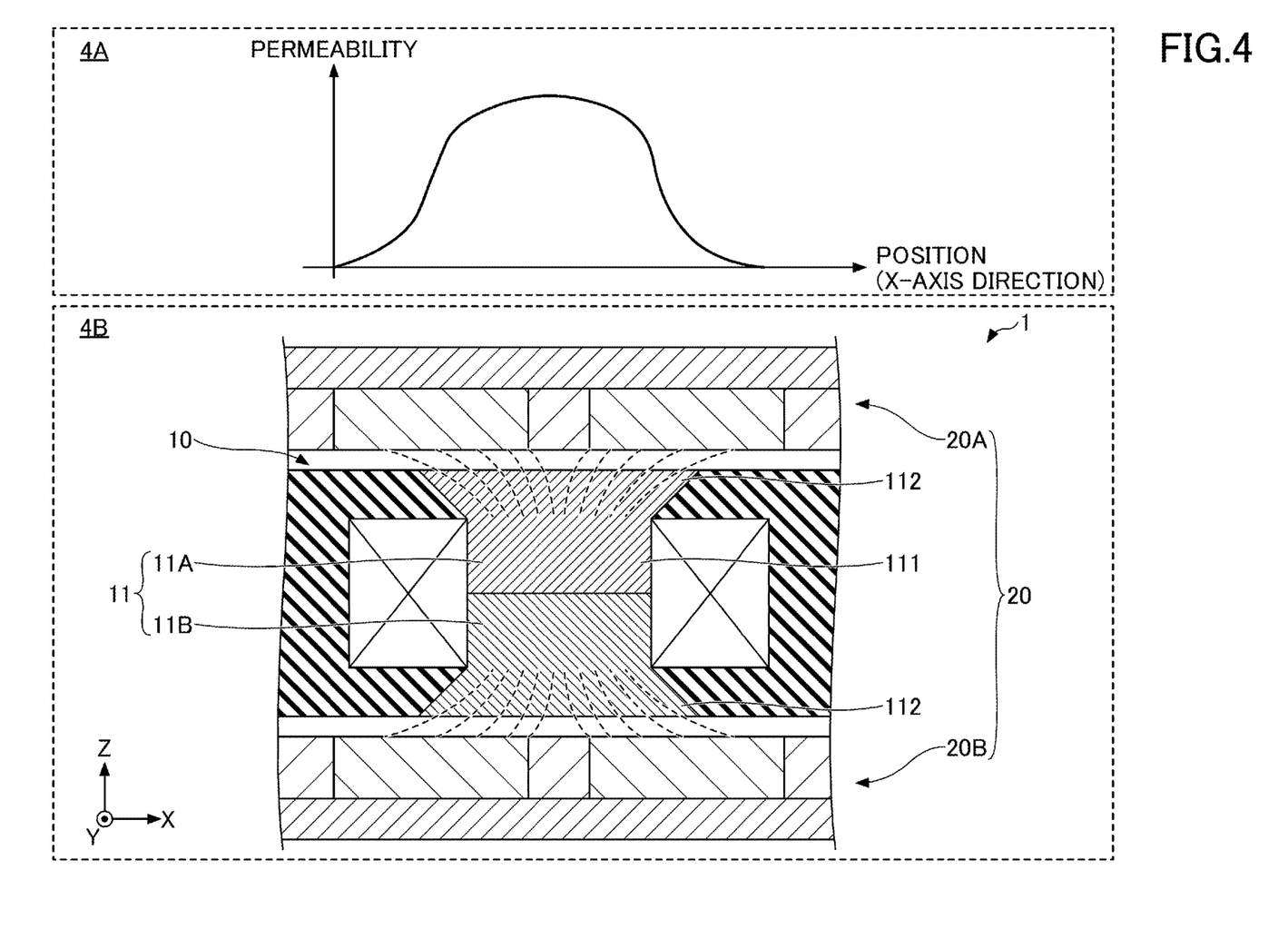
FIG. 4 is a diagram illustrating a distribution of magnetic permeability of a core in proximity to a gap surface in the armature according to the embodiment.

FIG. 3 is a diagram illustrating a distribution of magnetic permeability of a core 11c in proximity to a gap surface in an armature 10c according to the comparative example. Specifically, FIG. 3 includes FIG. 3A that illustrates the distribution of the magnetic permeability of the core 11c in proximity to the gap surface in the X-axis direction in the armature 10c of the linear motor 1 according to the comparative example and FIG. 3B that illustrates the magnetic flux lines (refer to dotted lines in the figure) in the armature 10c according to the comparative example. FIG. 4 is a diagram illustrating a distribution of magnetic permeability of the core 11 in proximity to a gap surface in the armature 10 according to the present embodiment (the first example). Specifically, FIG. 4 includes FIG. 4A that illustrates the distribution of the magnetic permeability of the core 11 in proximity to the gap surface in the X-axis direction in the armature 10 of the linear motor 1 according to the present embodiment (the first example) and FIG. 4B that illustrates the magnetic flux lines (refer to dotted lines in the figure) in the armature 10c according to the present embodiment (the first example).

In FIG. 3 (FIG. 3B), among the components of the linear motor 1c according to the comparative example, the same components as those of the linear motor 1 according to the present embodiment are designated by the same reference numerals.

As illustrated in FIG. 3B, the core 11c of the armature 10c according to the comparative example has substantially the same cross-section over the entire space between both ends in the Z-axis direction, which is different from the core 11 according to the present embodiment. Therefore, when a magnetic attraction force toward either one of the field magnet sections 20A and 20B acts on the core 11c, the core 11c may become detached from the armature 10c in such a manner that the core 11c is separated from the central portion of the coil 12 and the holding section 13 in the positive Z-axis direction or the negative Z-axis direction.

On the contrary, in the armature 10 according to the present embodiment, even when a magnetic attraction force toward either one of the field magnet sections 20A and 20B acts on the core 11, the flange section 112 on the opposite side of the magnetic attraction force comes into contact with (is caught by) the coil 12 or the holding section 13. Therefore, the core 11 is restricted from moving in the Z-axis direction. Accordingly, the detachment of the core 11 composed of the members 11A and 11B connected as a single body from the armature 10 can be prevented.

Further, as illustrated in FIG. 3 (FIG. 3B), the core 11c of the armature 10c according to the comparative example is composed of one integral component. Therefore, if the flange section 112 is adopted to prevent the core 11c from being separated from the armature 10c as in the armature 10 according to the present embodiment, the core 11c cannot be inserted, from the tip portion, into the central portion corresponding to the winding shaft of the manufactured coil 12. As a result, although the armature 10c according to the comparative example can prevent the detachment of the core 11c from the armature 10c, the productivity of the armature 10c may be reduced because the coil 12 becomes required to be manufactured in a manner in which the lead wire is wound directly around the core 11c.

On the contrary, the armature 10 according to the present embodiment includes two members 11A and 11B divided by the division surface 11DS between the two flange sections 112 in the Z-axis direction. Therefore, as described above, the core 11 and the coil 12 can be assembled by inserting the tip portions of the members 11A and 11B on the division surface 11DS side into the central portion of the manufactured coil 12 from both sides. Accordingly, the decrease in the productivity of the armature can be prevented while preventing the detachment of the core 11 from the armature 10.

Further, as illustrated in FIG. 3 (FIG. 3B), the area of the gap surface at both ends of the core 11c facing the field magnet sections 20A and 20B is substantially the same as the cross-sectional area of the XY plane of the intermediate section in the Z-axis direction surrounded by the coil 12.

On the contrary, in the armature 10 according to the present embodiment, the area of the gap surface 11GS at both ends of the core 11 facing the field magnet sections 20A and 20B is larger than the cross-sectional area of the XY plane of the intermediate section 111 surrounded by the coil 12. Therefore, as illustrated in FIG. 3 (FIG. 3B) and FIG. 4 (FIG. 4B), the armature 10 according to the present embodiment, the magnetic flux generated from the permanent magnets 21 of the field magnet sections 20A and 20B is more likely to pass through the core 11 through the gap surface 11GS than the armature 10c according to the comparative example. As a result, in the armature 10 according to the present embodiment, compared with the armature 10c according to the comparative example, the magnetic flux that interlinks the coil 12 is relatively large, and the thrust (average thrust) of the linear motor 1 can be relatively increased.

Further, as illustrated in FIG. 3 (FIG. 3A), in the armature 10c according to the comparative example, the magnetic permeability of the portion in proximity to the gap surface of the core 11c changes abruptly at the boundary portion between the gap surface of the core 11c and the holding section 13 in the X-axis direction. This is because the dimension of the gap surface of the core 11c in the X-axis direction is relatively small, and the distance from the gap surface of other cores 11c adjacent to each other in the X-axis direction becomes relatively large. Therefore, in the linear motor 1c including the armature 10c according to the comparative example, the thrust fluctuation may become relatively large.

On the contrary, in the armature 10 according to the present embodiment, the magnetic permeability of the portion of the core 11 in proximity to the gap surface 11GS changes smoothly even at the boundary portion between the gap surface of the core 11 and the holding section 13 in the X-axis direction. This is because the dimension of the gap surface 11GS of the core 11 in the X-axis direction is relatively large, and the distance from the gap surface 11GS of other cores 11 adjacent to each other in the X-axis direction becomes relatively small. Therefore, in the linear motor 1 including the armature 10 according to the present embodiment, the thrust fluctuation can be controlled to be relatively small, and the reliability can be relatively improved.

Second Example of Armature

Next, a second example of an armature 10 according to the present embodiment will be specifically described with reference to FIG. 5. Hereinafter, the parts different from the first example described above will be mainly described, and the description of the same or corresponding contents as the first example may be simplified or omitted.

Figure 5:
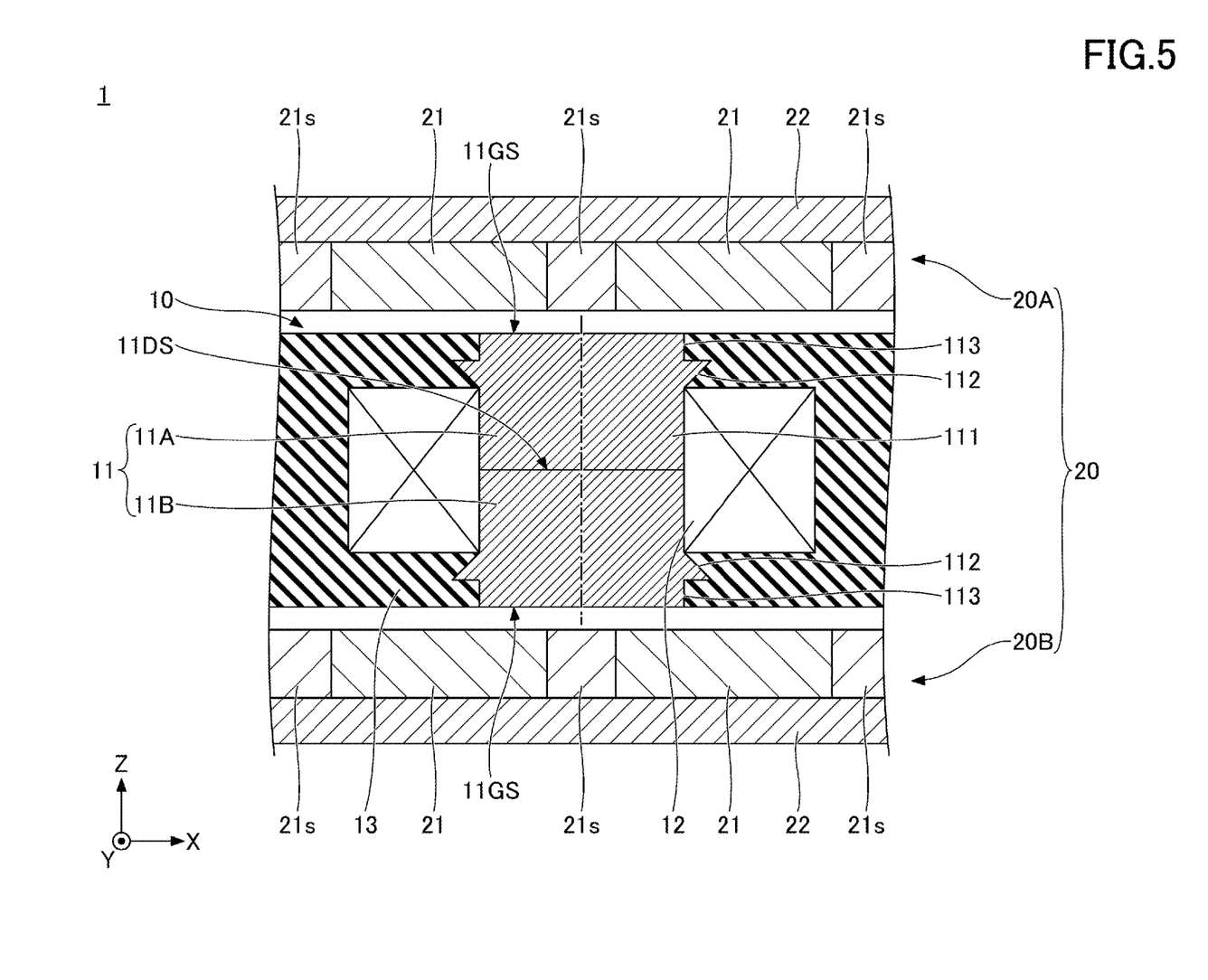
FIG. 5 is a diagram illustrating a second example of a structure of the armature.

FIG. 5 is a diagram illustrating a second example of the structure of the armature 10. Specifically, FIG. 5 is a cross-sectional view of a linear motor 1 including the armature 10 according to the present example in the XZ plane viewed from the positive Y-axis side.

As illustrated in FIG. 5, a core 11 includes an intermediate section 111, a flange section 112, and a non-protrusion section 113.

As in the case of the first example described above, the flange sections 112 are provided at two locations, in the Z-axis direction, between the intermediate section 111 and each of both ends of the core 11. In the present example, the flange section 112 is provided between the intermediate section 111 and the non-protrusion section 113 in the Z-axis direction, and the outer peripheral surface extends outward from the intermediate section 111 side toward the non-protrusion section 113 side. Therefore, the flange section 112 is configured to protrude toward the holding section 13 on the more central side than both ends of the core 11.

The non-protrusion section 113 is provided between the flange section 112 and the end portion of the core 11 in the Z-axis direction. In the present example, the non-protrusion section 113 is provided in a range extending from the flange section 112 to the end portion of the core 11 in the Z-axis direction. The non-protrusion section 113 is configured so as not to protrude toward the holding section 13 with the intermediate section 111 as a reference and the outer peripheral surface is retracted inward from the flange section 112. In the present example, the non-protrusion section 113 has substantially the same outer peripheral surface as the intermediate section 111 in the Z-axis direction. Therefore, the non-protrusion section 113 includes a stepped surface (a straight line portion horizontal to the Z-axis direction in FIG. 5) at the boundary portion with the flange section 112 in the Z-axis direction.

Further, as in the case of the first example described above, the core 11 includes a division surface 11DS between the two flange sections 112 in the Z-axis direction, and includes two members 11A and 11B.

The members 11A and 11B are connected to each other by, for example, an adhesive applied to the division surface 11DS.

The armature 10 of the present example may be manufactured by the same steps as in the case of the first example described above.

As described above, with respect to the core 11 of the present example, the non-protrusion section 113 is provided in addition to the flange section 112.

As a result, even if a magnetic attraction force in the positive Z-axis direction or a magnetic attraction force in the negative Z-axis direction acts on the members 11A and 11B, the flange section 112 or the non-protrusion section 113 comes into contact with (is caught by) the holding section 13, and the members 11A and 11B are restricted from moving. Therefore, in the armature 10, for example, even if a magnetic attraction force is generated in the core 11 toward either one of the field magnet sections 20A and 20B and the members 11A and 11B are disconnected for some reason, the detachment of the core 11 from the armature 10 can be prevented.

Third Example of Armature

Next, a third example of an armature 10 according to the present embodiment will be described with reference to FIG. 6. Hereinafter, the parts different from the first or the like example described above will be mainly described, and the description of the same or corresponding contents as the first example or the like may be simplified or omitted.

Figure 6:
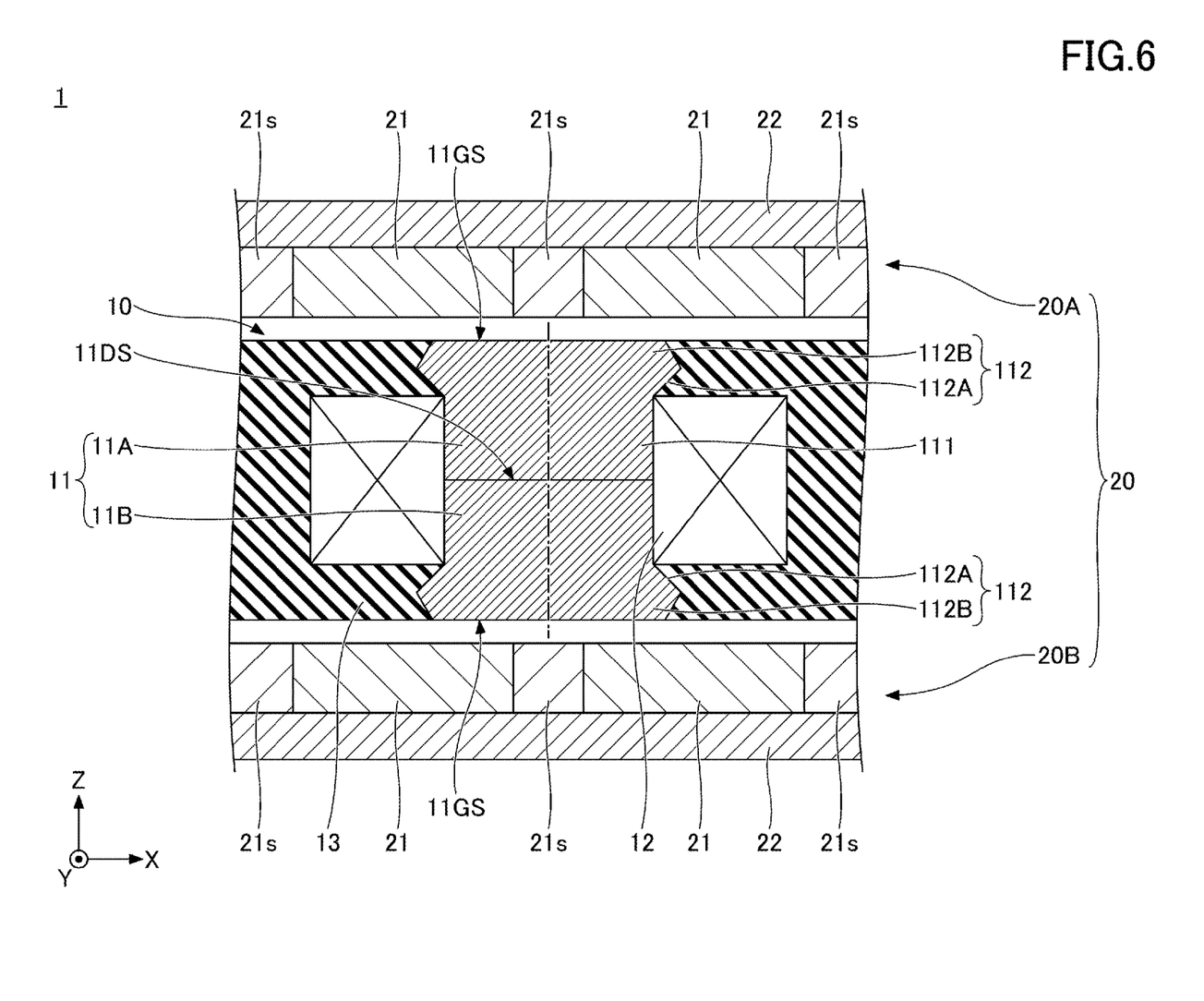
FIG. 6 is a diagram illustrating a third example of a structure of the armature.

As illustrated in FIG. 6, a core 11 includes an intermediate section 111 and a flange section 112 as in the case of the second example described above.

As in the case of the first example or the like described above, the flange sections 112 are provided at two locations, in the Z-axis direction, between the intermediate section 111 and each of both ends of the core 11. The flange section 112 includes flange sections 112A and 112B.

The flange section 112A is provided between the intermediate section 111 and the flange section 112B in the Z-axis direction, and is configured such that the outer peripheral surface expands outward from the intermediate section 111 side toward the flange section 112B side.

The flange section 112B is provided between the flange section 112A and the end portion of the core 11 in the Z-axis direction. In the present example, the flange section 112B is provided in a range extending from the flange section 112A to the end portion of the core 11 in the Z-axis direction. The flange section 112B is configured such that the outer peripheral surface is retracted inward (narrowed) from the flange section 112 toward the end portion of the core 11 in the Z-axis direction. Therefore, with respect to both ends of the flange sections 112 in the axial direction (Z-axis direction), the portion where the protrusion amount is smaller than the maximum portion (the boundary between the flange sections 112A and 112B) is exposed from the holding section 13.

The armature 10 of the present example may be manufactured by the same procedure as in the case of the first example described above.

As described above, in the present example, the flange sections 112A and 112B are provided in the core 11.

As a result, even if a magnetic attraction force in the positive Z-axis direction or a magnetic attraction force in the negative Z-axis direction acts on the members 11A and 11B, the flange section 112 or the non-protrusion section 113 comes into contact with (is caught by) the flange section 112A or the flange section 112B, and the members 11A and 11B are restricted from moving. Therefore, in the armature 10, for example, even if a magnetic attraction force is generated in the core 11 toward either one of the field magnet sections 20A and 20B and the members 11A and 11B are disconnected, the detachment of the core 11 from the armature 10 can be prevented.

Further, in the present example, the flange section 112B is configured such that the outer peripheral surface of the end portion of the core 11 protrudes toward from the intermediate section 111 in the Z-axis direction. This allows the area of the gap surface 11GS to be larger than the cross-sectional area (cross-sectional area of the XY plane) of the intermediate section 111. As a result, the magnetic flux generated from the permanent magnets 21 of the field magnet sections 20A and 20B easily passes through the gap surface 11GS of the core 11, and the magnetic flux that interlinks the coil 12 can be made relatively large (refer to FIG. 4B). Further, since the dimension of the gap surface 11GS of the core 11 in the X-axis direction is relatively large, as described above, fluctuations in the magnetic permeability in proximity to the gap surface of the armature 10 in the X-axis direction can be smoothed (refer to FIG. 4A). Therefore, it is possible to improve the (average) thrust of the linear motor 1 and improve the reliability by controlling the fluctuation of the thrust while preventing the disconnection of the core 11 in a situation where the members 11A and 11B are disconnected.

Other Embodiments

Next, other embodiments will be described.

The above-described embodiment may be modified or alternated as appropriate.

For example, in the above-described embodiment, the number of each of the core 11 and the coil 12 included in the armature 10 may be two or four or more.

Further, for example, in the above-described embodiment and modifications/alterations thereof, the spacer 21s may be omitted.

Further, for example, in the above-described embodiment and modifications/alterations thereof, the members 11A and 11B of the armature 10 according to the second and third examples described above may be held by the holding section 13 without being connected to each other. This is because, even if a magnetic attraction force is generated toward either one of the field magnet sections 20A and 20B and the members 11A and 11B are disconnected, the detachment from the armature 10 is prevented by the action of both of the flange section 112 and the non-protrusion section 113 or the action of both of flange section 112A and flange section 112B.

Further, for example, in the above-described embodiment and modifications/alterations thereof, the core 11 may be divided into two members 11A and 11B. However, as long as at least one division surface 11DS between the two flange sections 112 exists, the core 11 may be configured to be divisible into three or more members.

Further, for example, in the above-described embodiment and modifications/alterations thereof, the linear motor 1 may be configured such that the armature 10 is a stator and the field magnet 20 is a mover. In this case, the armature 10 is arranged so as to extend in the X-axis direction according to the movement range of the field magnet 20 as the mover of the X-axis direction and the field magnet 20 may be supported by a support mechanism in a manner surrounding the armature 10 on a plane perpendicular to the X-axis direction (i.e., a YZ plane).

Further, for example, in the above-described embodiment and modifications/alterations thereof, the mover of the linear motor 1 may be configured to be movable along a curved line instead of a straight line corresponding to the X-axis direction. In this case, for example, the armature 10 may be provided between the field magnet sections 20A and 20B and the field magnet sections 20A and 20B may have a substantially parallel curved shape when viewed in the Y-axis direction. In this case, "parallel" indicates a state in which two lines (including a curve) are maintained at equal intervals and do not intersect.

[Action]

Next, an action of the linear motor 1 (i.e., the armature 10) according to the present embodiment will be described.

In the present embodiment, the armature 10 includes multiple cores 11 that are not connected (discontinuous) to each other, multiple coils 12, and a holding section 13. Specifically, the multiple cores 11 are arranged in a straight line. More specifically, the multiple cores 11 are configured so as to extend in the Z-axis direction, and are arranged along the X-axis direction which is perpendicular to the Z-axis direction. Further, the multiple coils 12 are wound around each of the multiple cores 11. Further, the multiple cores 11 are held by the holding section 13. The multiple cores 11 include members 11A and 11B that are separate from each other and arranged in the axial direction (Z-axis direction), and the members 11A and 11B include a flange section 112 in which at least a part of the contact portion with the holding section 13 protrudes toward the holding section 13. More specifically, each of the multiple cores 11 includes an intermediate section 111 around which the coil 12 is wound in the Z-axis direction and a flange section 112 configured such that the outer peripheral surface protrudes toward from the intermediate section 111 in a range between each of both end portions. Also, each of the multiple cores 11 includes multiple members 11A and 11B divided by a division surface 11DS which is provided between the two flange sections 112 in the Z-axis direction.

As a result, in the armature 10 according to the present embodiment, even if a magnetic attraction force toward either one of the field magnet sections 20A and 20B acts on the core 11, the flange section 112 on the opposite side of the core 11 comes into contact with the holding section 13, and thus the movement of the core 11 can be restricted integrally. Therefore, the armature 10 can prevent the detachment of the core 11. Further, since the core 11 is divided into the members 11A and 11B at division surface 11DS between the two flange sections 112, an operator or the like can insert the members 11A and 11B into the central portion of the manufactured coil 12 from the division surface 11DS side in a state of being divided into the members 11A and 11B. Therefore, for example, the armature 10 according to the present embodiment can prevent a decrease in productivity because it is not necessary to assemble the core 11 and the coil 12 such that the conducting wire is directly wound around the intermediate section 111 of the core 11. Accordingly, the armature 10 according to the present embodiment can prevent the decrease in the productivity of the armature 10 while preventing the multiple cores 11 that are not connected to each other from detaching from the armature 10.

Further, in the present embodiment, the flange section 112 is configured such that the outer peripheral surface protrudes toward from the intermediate section 111 and the end portion. For example, the flange section 112 is configured to protrude toward the holding section 13 on the more central side than both ends in the axial direction (Z-axis direction). Further, the flange section 112 may be configured such that a portion where the protrusion amount is smaller than the maximum portion is exposed from the holding section 13.

As a result, in the armature 10, even if a magnetic attraction force toward either one of the field magnet sections 20A and 20B acts on the core 11, the flange section 112 comes into contact with the holding section 13. Therefore, the members 11A and 11B can be restricted from moving. Accordingly, the armature 10 can prevent the detachment of the core 11 (i.e., the members 11A and 11B) regardless of whether the members 11A and 11B are connected. Further, since the core 11 is divided into the members 11A and 11B at the division surface 11DS between the two flange sections 112, an operator or the like can insert the members 11A and 11B into the central portion of the manufactured coil 12 from the division surface 11DS side in a state of being divided into the members 11A and 11B. Therefore, as described above, the armature 10 according to the present embodiment can prevent the decrease in the productivity. Accordingly, the armature 10 according to the present embodiment can prevent the decrease in the productivity of the armature 10 while preventing the multiple cores 11 that are not connected to each other from detaching from the armature 10.

Further, in the present embodiment, the end portion of the core 11 may be configured such that the outer peripheral surface protrudes toward from the intermediate section 111. For example, the flange section 112 may be configured such that the portion having the maximum protrusion amount is exposed from the holding section 13. Further, the portion where the protrusion amount is smaller than the maximum portion may be configured to be exposed from the holding section 13.

This enables the armature 10 according to the present embodiment to relatively increase the dimension of the end portion of the core 11, that is, the gap surface 11GS facing the field magnet sections 20A and 20B in the X-axis direction. Therefore, the armature 10 can efficiently pass the magnetic flux of the permanent magnets 21 of the field magnet section 20A and 20B through the core 11 to increase the thrust of the linear motor 1. Further, the armature 10 has a relatively short distance from the other adjacent cores 11 in proximity to the gap surface 11GS of the core 11 in the X-axis direction. Therefore, the armature 10 can smooth fluctuations in the magnetic permeability in proximity to the gap surface between the field magnet section 20A and the field magnet section 20B in the X-axis direction.

Accordingly, the armature 10 can control the change in the thrust of the linear motor 1 and improve the reliability of the linear motor 1.

Further, in the present embodiment, the flange section 112 may be configured such that the portion having the maximum protrusion amount is exposed from the holding section 13 under the premise that the members 11A and 11B are connected to each other. Specifically, the flange section 112 is provided in a range including the end portion of the core 11 in the Z-axis direction on the premise that the members 11A and 11B are connected to each other, and may be configured such that the outer peripheral surface extends outward from the intermediate section 111 toward the end portion of the core 11.

This enables the armature 10 according to the present embodiment to relatively increase the dimension of the end portion of the core 11, that is, the gap surface 11GS facing the field magnet sections 20A and 20B in the X-axis direction. Therefore, the armature 10 can increase the thrust of the linear motor 1 as described above, while controlling the fluctuation of the thrust of the linear motor 1 to improve the reliability of the linear motor 1.

Further, in the manufacturing process of the armature 10 of the present embodiment, multiple coils 12 are wound so as to have a cavity in the central portion. Then, for each of the multiple cores 11, the members 11A and 11B in which the core 11 is divided into multiple cores 11 are inserted into the cavities in the central portion from both sides of the coil 12 so that the coil 12 is wound around the core 11. That is, the armature 10 is manufactured by an operator or the like, with respect to the multiple cores 11, by inserting the member corresponding to both ends of the multiple members 11A and 11B in a separated state into the central cavity from both sides of the coil 12.

Since the coil 12 has a cavity in the central portion, as described above, the coil 12 may be formed by winding an electric wire around a hollow member such as a bobbin or may be formed by pulling out from a dedicated jig after the electric wire is wound around the dedicated jig.

As a result, the operator or the like can assemble the manufactured coil 12 to the core 11 even when the flange sections 112 are provided at both ends of the core 11 in the X-axis direction.

Further, in the manufacturing process of the armature 10 of the present embodiment, a step of joining the members 11A and 11B may be included after the members 11A and 11B are inserted into the cavities in the central portion from both sides of the coil 12 for each of the multiple cores. Further, at this time, a step of applying an adhesive member such as solder to the joint surfaces of the members 11A and 11B may be included in advance.

As a result, the operator or the like can integrally connect the multiple members 11A and 11B as the core 11. Then, by integrally connecting the armature 10, even if a magnetic attraction force toward either one of the field magnet sections 20A and 20B acts on the core 11, the flange section 112 at the opposite end of the core 11 comes in contact with the holding section 13. Therefore, the core 11 in which the multiple members 11A and 11B are integrally connected can be restricted from moving. Therefore, the armature 10 can prevent the detachment of the core 11.

Although the embodiments have been described in detail above, the present disclosure is not limited to such specific embodiments, and various modifications/alterations can be made within the scope of the gist described in the claims.

What is claimed is:

1. An armature comprising:
    a plurality of cores arranged in a straight line and discontinuous with each other;
    a plurality of coils wound around each of the plurality of cores; and
    a holding section configured to hold the plurality of cores,
    wherein at least one of the plurality of cores include division cores separate from each other at a division surface and arranged in an axial direction thereof; and
    wherein each of the division cores has a flange at a contact surface thereof that is in contact with the holding section, and at least a portion of the contact surface protrudes toward the holding section to form the flange, and
    wherein the division surface overlaps with the plurality of coils in the axial direction.

2. The armature according to claim 1, wherein the division cores are connected to each other, and
    with respect to the flange, a portion where a protrusion amount is maximum is exposed from the holding section.

3. The armature according to claim 1, wherein the flange protrudes toward the holding section on a more central side than both ends in the axial direction.

4. The armature according to claim 1, wherein, with respect to the flange, a portion where a protrusion amount is smaller than a maximum portion is exposed from the holding section.

5. A linear motor comprising the armature according to claim 1.

6. A method of manufacturing the armature according to claim 1, the method comprising:
    preparing a coil that has been wound in advance such that a cavity is formed in a center; and
    forming a core in which the coil is wound around thereof by inserting each of the division cores into the cavity from both end sides of the coil.

7. The method of manufacturing the armature according to claim 6 further comprising joining the division cores after inserting each of the division cores into the cavity from both end sides of the coil.

* * * * *